(12) United States Patent
Jorgensen et al.

(10) Patent No.: US 7,612,937 B2
(45) Date of Patent: *Nov. 3, 2009

(54) ADVANCED ULTRAVIOLET-RESISTANT SILVER MIRRORS FOR USE IN SOLAR REFLECTORS

(75) Inventors: Gary J. Jorgensen, Pine, CO (US); Randy Gee, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/303,836

(22) Filed: Dec. 16, 2005

(65) Prior Publication Data

US 2006/0181765 A1  Aug. 17, 2006

(51) Int. Cl.
*F21V 9/06* (2006.01)
*G02B 5/20* (2006.01)
*G02B 5/08* (2006.01)

(52) U.S. Cl. .................... 359/361; 359/360; 359/883; 359/884; 428/458

(58) Field of Classification Search ............. 359/883, 359/360, 361, 884; 362/320; 428/458
See application file for complete search history.

(56) References Cited

U.S. PATENT DOCUMENTS

| | | | |
|---|---|---|---|
| 2,955,955 A | 10/1960 | Orr | |
| 3,775,226 A | 11/1973 | Windorf | |
| 4,226,910 A | 10/1980 | Dahlen et al. | |
| 4,230,763 A | 10/1980 | Skolnick | |
| 4,307,150 A | 12/1981 | Roche | |
| 4,414,254 A | 11/1983 | Iwata et al. | |
| 4,446,262 A | 5/1984 | Okumura et al. | |
| 4,493,872 A | 1/1985 | Funderburk et al. | |
| 4,645,714 A * | 2/1987 | Roche et al. | 428/458 |
| 4,666,263 A | 5/1987 | Petcavich | |
| 4,710,426 A | 12/1987 | Stephens | |
| 4,853,283 A | 8/1989 | Skolnick | |
| 4,933,823 A | 6/1990 | Taylor | |
| 5,063,112 A | 11/1991 | Gross et al. | |
| 5,069,964 A | 12/1991 | Tolliver et al. | |
| 5,118,540 A | 6/1992 | Hutchison | |
| 5,251,064 A | 10/1993 | Tennant et al. | |
| 5,276,600 A * | 1/1994 | Takase et al. | 362/320 |
| 5,361,172 A * | 11/1994 | Schissel et al. | 359/883 |
| 5,681,642 A | 10/1997 | Sugisaki et al. | |
| 5,846,659 A | 12/1998 | Lower et al. | |
| 6,989,924 B1 * | 1/2006 | Jorgensen et al. | 359/361 |
| 2006/0181765 A1 | 8/2006 | Jorgensen et al. | |

FOREIGN PATENT DOCUMENTS

| | | |
|---|---|---|
| CA | 721243 | 11/1965 |
| JP | 59012952 A | 1/1984 |
| JP | 62011744 A | 1/1987 |
| JP | 2002063807 | 2/2002 |
| JP | 2003229009 | 8/2003 |
| WO | WO 00/07818 | 2/2000 |

* cited by examiner

*Primary Examiner*—Audrey Y Chang
(74) *Attorney, Agent, or Firm*—Greenlee, Winner and Sullivan, P.C.

(57) ABSTRACT

A silver mirror construction that maintains a high percentage of hemispherical reflectance throughout the UV and visible spectrum when used in solar reflectors, comprising:

a) a pressure sensitive adhesive layer positioned beneath a silver overlay;

b) a polymer film disposed on the silver overlay;

c) an adhesive layer positioned on the polymer film; and d) a UV screening acrylic film disposed on the adhesive layer.

12 Claims, 3 Drawing Sheets

ADVANCED ULTRAVIOLET-RESISTANT SILVER MIRRORS FOR USE IN SOLAR REFLECTORS

CONTRACTUAL ORIGIN OF THE INVENTION

The United States Government has rights in this invention pursuant to Contract No. DE-AC36-99GO10337 between the United States Department of Energy and the National Renewable Energy Laboratory, division of Midwest Research Institute.

BACKGROUND OF THE INVENTION

1. Field of the Invention

The invention relates to advanced ultraviolet-resistant specular silver mirrors for use in solar reflectors, and is a continuation-in-part of U.S. patent application Ser. No. 09/762,719 filed Feb. 9, 2001. More particularly, the invention relates to advanced, ultraviolet-resistant specular silver mirrors for use in solar reflectors, said mirrors being characterized by substantially improved optical durability and superior resistance to tunneling or delamination failure under outdoor environmental conditions.

2. Description of the Prior Art

Insufficient weather protection and ultraviolet degradation are problems encountered when using solar reflectors made of a flexible specular silver mirror. When used outdoors, these mirrors must be durable and ultraviolet light (UV) resistant in order to retain their dimensional stability, aesthetic appearance, and specular-reflectance in the visible, ultraviolet, and near infrared wavelengths.

Specular-reflectance is provided in a flexible silver mirror through a silvered composite lamina, having a thin layer of silver vacuum-deposited on the surface of a flexible polymer substrate. Silver is the preferred metal because its reflectivity is substantially higher than that of other metals, such as aluminum. To retain specular reflectance over time, the prior art has focused on the application of advanced adhesives and protective layers, coated over the polymer substrate and silver layer, to protect the mirrors from abrasion, weathering, and ultraviolet degradation.

Early techniques used to protect solar mirrors from abrasion, weathering, and ultraviolet degradation were developed with aluminum mirrors. For example, in U.S. Pat. No. 4,307,150, a solar reflector is disclosed wherein an opaque aluminum surface, vacuum-deposited on a flexible polyester support-sheet, is protected from corrosion and weathering with an inter-polymer layer of acrylate or methacrylate copolymers. The support sheet consists of a biaxially oriented polyethylene terephthalate lamina having conventional slip agents, to facilitate winding, and a second polyethylene terephthalate lamina which contains no slip agent.

Silver is higher in specular reflection than aluminum. Thus, the logical assumption had been to substitute silver for aluminum in the solar reflector described above. However, this approach has been reported, in U.S. Pat. No. 4,645,714, to result in two undesirable phenomena: First, silver is susceptible to corrosion either through the development of pin holes in the acrylate coating or along peripheral portions of the silver-coated film. Second, a thin layer of silver, unlike a thin layer of aluminum, has a spectral window through which ultraviolet ("UV") light readily passes. The peak transmission of this light is at 320 nm, and sunlight contains ultraviolet light in this wavelength. The transmission of ultraviolet light through the silver layer degrades the underlying polyester substrate causing bubbles in the adhesives, commonly used to adhere the substrate to a rigid support. This degradation and bubbling reduces the aesthetic and specular functional properties of the solar mirror.

Corrosion inhibitors and UV absorbers, incorporated into the adhesives or protective film coatings overlaying a polyester and silver mirror substrate, have been used to retain these functional properties. However, while corrosion inhibitors do reduce corrosion, they frequently impart an unacceptable color to the mirror, over time, and do not block the ultraviolet light. In contrast, when ultraviolet light absorbers are incorporated into a protective polymer overlay, the rate of polyester support degradation is lessened, but silver corrosion is aggravated. Thus, attempts have been made to isolate the corrosion inhibitor and ultraviolet absorber elements from the mirror's reactive components in order to eliminate these undesirable effects.

In Roche, U.S. Pat. No. 4,645,714, a corrosion resistant silver mirror is disclosed wherein a corrosion inhibitor, and an ultraviolet absorber are each incorporated into separate thin overlays of an acrylate inter-polymer paint. The specular reflective mirrors are formed by vacuum-depositing silver over a polyester support film. Ultraviolet degradation of the polyester support, and consequent bubbling of the underlying adhesive, is reduced by incorporating UV absorbers in a second polymer coating that is applied over a first polymer coating, which incorporates a corrosion inhibitor. The first polymer coating is applied directly over the silver reflective surface. The polymeric substrate, a coextruded biaxially oriented polyester foil, comprises: (1) a polyethylene terephthalate lamina containing conventional slip agents to facilitate roll-winding; and (2) a polyethylene terephthalate lamina containing no slip agent, which results in an optically-smooth exposed surface. The silver specular reflective layer overlies the smooth surface, of the coextruded film, and is bonded thereto. Layered over the silver is a first acrylate or methacrylate inter-polymer coating, having a 0.5 to 2.5% glycol dimercaptoacetate dispersant, which serves as a coupling agent, primer, and corrosion inhibitor. This coating weighs 1-4 $g/m^2$. Overlying the first acrylate coating, is a second acrylate coating containing an ultraviolet absorber effective throughout the 300-400 nanometer range. The weight of the second coating is 4-8 $g/m^2$. Inclusion of the corrosion inhibitor and the UV absorber into separate layers is designed to keep the UV absorber out-of-contact with the silver, and to avoid any corroding effect. On the opposite side of the coextruded polyester support is a uniform coating, weighing about 10-15 $g/m^2$, of a tacky and pressure-sensitive adhesive (95:5 isooctyl acrylate:acrylamide copolymer). A conventional release liner, such as a silicone-coated polyester film, may be used to protect the adhesive prior to use. The disclosure of U.S. Pat. No. 4,645,714 is incorporated by reference as though fully set forth herein.

It is believed, however, by Hutchinson, U.S. Pat. No. 5,118,540, that the reflective films described in U.S. Pat. Nos. 4,307,150, and 4,645,714 are generally unsuitable for solar energy applications. Under outdoor conditions, the thin acrylate flood coat, of these films, tends to weather poorly and to quickly erode. These coatings thus offer an insufficient protective barrier to abrasion and moisture. Where the solar mirror comprises a substrate having a polyester support sheet and a layer of silver, as the outer acrylate flood coat, containing UV absorbers, ultraviolet light erodes and degrades the polyester support, and the mirror's aesthetic appearance and optical efficiency fail. In order to mitigate this problem, Hutchinson discloses the use of corrosion inhibitors and ultraviolet absorbers in an adhesive, which is used to bond an abrasion and moisture resistant fluorocarbon protective coating over a polyester and silver mirror substrate. The relevant embodiment, therein, describes a corrosion and ultraviolet light resistant flexible reflective film, where the respective inhibitors and absorbers are incorporated into separate coatings of an adhesive. A thin layer of silver is vacuum-deposited on a flexible polyester support sheet, producing the specular silver surface. The adhesive is used to bond a fluorocarbon film, having an abrasion and weather resistant function, to the surface of the silver. The adhesive is applied in two separate layers. The first adhesive layer is adjacent to the silver deposit and contains a corrosion inhibitor. The second adhesive layer contains a UV absorber and overlays the first adhesive layer for use in bonding the fluorocarbon protective film to the silver surface. The use of adhesives to bond the fluorocarbon film to the silver surface is a required element of this construction because fluorocarbon films do not bond to metal surfaces. However, this construction is not without its deficiencies when used, over time, as a solar mirror. Under ultraviolet light, the application of advanced adhesives (those incorporating UV absorbers and corrosion inhibitors) directly onto a silver substrate has resulted in degradation of the silver/adhesive interface. When silver is adhered directly to acrylic films, delamination failures have also occurred. Moreover, fluorocarbon protective films, without UV absorbers often provide an insufficient weather resistant shield. For these reasons, it is believed that these silver mirrors when applied as solar reflectors remain lacking in long-term durability, which results in a loss of optical efficiency and aesthetic appearance.

A need exists for an advanced ultraviolet-resistant silver mirror, which effectively screens ultraviolet light, retains its specular optical efficiency and aesthetic appearance, demonstrates substantially improved optical durability compared to prior polymeric reflector mirrors, and exhibits extraordinary resistance to delamination failure.

SUMMARY

One object of the invention is to provide a construction of an advanced solar reflector material having improved optical durability compared to prior art polymeric reflector constructions.

Another object of the invention is to provide a construction of an advanced solar reflector material having improved resistance to tunneling or delamination failure.

A further object of the invention is to provide a construction of an advanced solar reflector mirror in which the silver layer is located beneath a polyester film layer to keep the top side of the silver layer away from contact with adhesive to allow extensive UV-screening by the top layer, so as to protect both the polyester and the silver/polymer interface from UV degradation.

A still further object of the invention is to provide a construction of an advanced solar reflector mirror in which the silver layer is located beneath a polyester film layer to keep the top side of the silver layer away from contact with adhesive to allow extensive UV-screening by the top layer, so as to protect both the polyester and silver/polymer interface from UV degradation; and wherein a copper layer is added below the silver layer to allow separation of the backside of the silver from the pressure sensitive adhesive.

Briefly, the invention provides a construction of an advanced solar reflector mirror in which the silver layer is located beneath a polyester film layer to keep the top side of the silver layer away from contact with adhesive to allow extensive UV-screening by the top layer, to protect both the polyester and the silver/polymer interface from UV degradation.

The foregoing specific objects and advantages of the invention are illustrative of those which can be achieved by the present invention and are not intended to be exhaustive or limiting of the possible advantages which can be realized. Thus, those and other objects and advantages of the invention will be apparent from the description herein or can be learned from practicing the invention, both as embodied herein or as modified in view of any variations which may be apparent to those skilled in the art.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

DESCRIPTION OF THE PREFERRED EMBODIMENTS

The present invention provides advanced ultraviolet resistant specular silver mirrors, for use in solar reflectors, wherein the mirrors are characterized by substantially improved optical durability and superior resistance to tunneling or delamination failure under outdoor environmental conditions.

Figure 1:
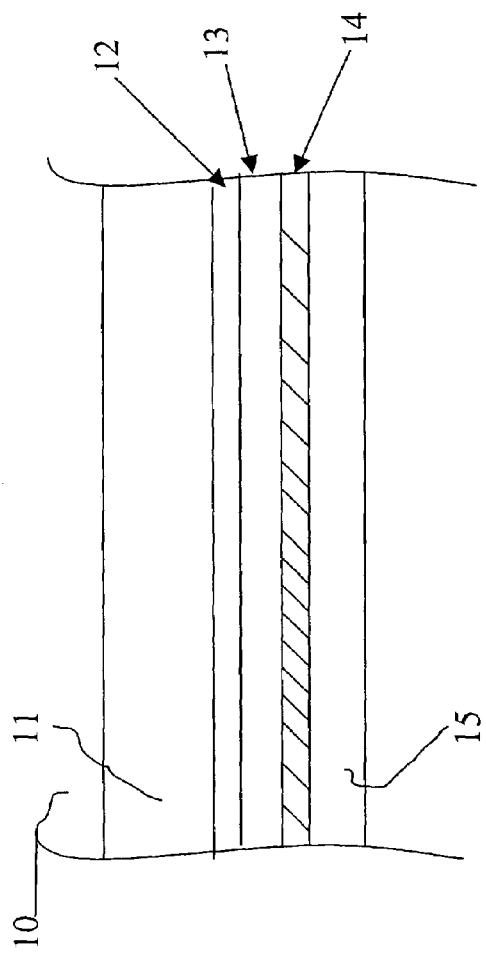
FIG. 1 is a cross-sectional view showing the advanced solar reflector in which the silver layer is located beneath a polyester film layer in accordance with the invention construction.

Reference is now made to the drawing figures, in which like numerals represent like elements, and where there is generally shown the silver mirror 10, in FIG. 1, in its most basic configuration. The silver mirror 10 is comprised of a UV screening acrylic film 11 disposed on an adhesive layer 12 deposited on a polyester film 13. The silver overlay 14 is located beneath the polyester film layer, thereby keeping the top illuminated side of the silver layer away from contact with the adhesive, which is a material that can cause degradation of the silver layer. A pressure sensitive adhesive layer 15 is positioned beneath the silver overlay 14.

In the construction shown in FIG. 1, the silver layer is located beneath a polyester film layer, and although this results in a slightly lower reflectance compared to a construction in which the silver layer is above the polyester layer, this construction keeps the top side of the silver layer (the illuminated side), and therefore the side most subject to UV-activated degradation (away from contact with the adhesive), which is a material that can promote silver degradation. The adhesive is highly optically transmissible to visible, ultraviolet, and near infrared light. The key to durability and outdoor weatherability of this construction is the extensive UV-screening by the top layer which protects both the polyester (from UV degradation) and the silver/polymer interface (which is also subject to UV degradation).

The invention builds upon the previously disclosed novel way of constructing an advanced silver mirror in which commercially available materials, that are individually inadequate as solar mirrors, are combined in a unique way to result in a durable outdoor weatherable solar reflector. The earlier construction describes a solar reflector construction in which SS-95, a low-cost reflective material that was developed by the 3M Company, is combined (through various bonding means) with a UV-screening film. SS-95 by itself does not possess sufficient outdoor weatherability to be a viable material for use on solar devices. The outdoor weatherability of SS-95 is inherently very limited because the very thin overcoats that are used to manufacture the product cannot provide sufficient protection to the underlying silvered reflective layer. However, when protected with a much thicker UV-screening film, outdoor weatherability is achieved.

In the present invention there are improvements and additions to this concept. An acrylic-based UV-screening film (named Korad™) is a commercially available product. This product possesses properties that make it a good top layer for the Advanced Solar Reflector. While other silver reflector films (different than SS-95) were found to be commercially available, these other commercially available silver reflector films do not possess good outdoor weatherability because of inherent limitations in these materials and their constructions. These commercially available silvered films are made for indoor use, such as enhancing the performance of office light fixtures. With the addition of a top layer of UV-screening film (e.g. Korad™), a suitable solar reflector results, which demonstrates much improved outdoor weatherability. The acrylate polymer film may be, for example, the KORAD KLEAR™high gloss acrylic film, which is commercially available under the trade designations KORAD KLEAR™ 05005 in a roll thickness of 2-8 mil, or the 3M Company extruded acrylic film sold under the trade designation 3M X09105, which is 3.5 mil thick.

Figure 2:
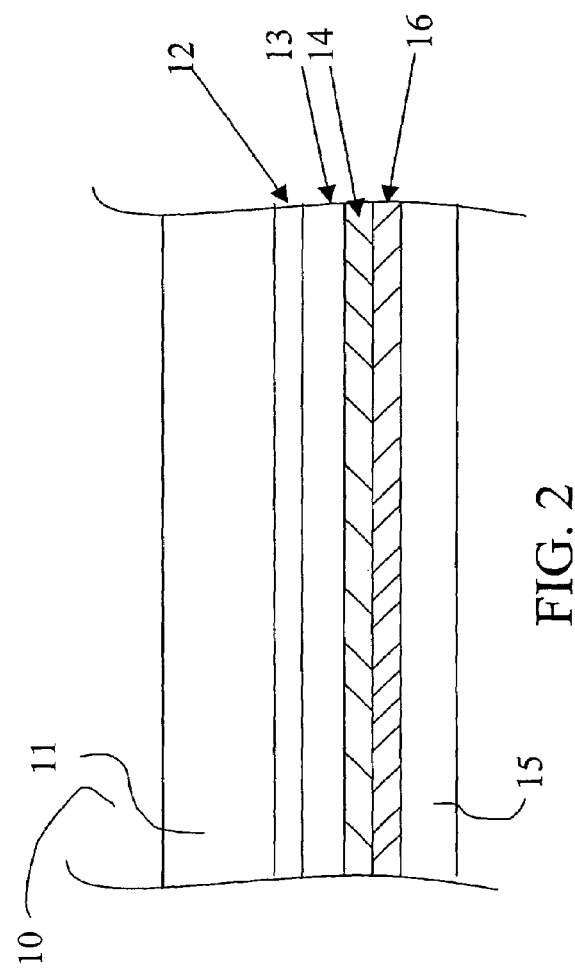
FIG. 2 is a cross-sectional view showing an alternative embodiment of the advanced solar reflector in which the silver layer is located beneath a polyester film layer, and a copper layer is disposed beneath the silver layer.

Referring to FIG. 2, there is shown a further embodiment of the advanced ultraviolet-resistant silver mirror for use in solar reflectors. In this embodiment, a copper layer 16 is situated below the silver layer 14 and above pressure sensitive adhesive layer 15. This construction produces an advanced ultraviolet-resistant silver mirror, which when used in solar reflectors, provides even better outdoor weatherability because of the separation of the backside of the silver layer from the pressure sensitive adhesive layer 15.

Accelerated exposure testing performed on the constructions of FIGS. 1 and 2, for example, using accelerated laboratory-controlled and accelerated outdoor environment testing demonstrates substantially improved optical durability compared with prior polymeric reflector mirrors, in that prior art polymer mirrors were especially susceptible to failure mode known as tunneling wherein the reflective layer catastrophically delaminates from the polymer layer in the presence of moisture. Further, accelerated weather exposure tests of this new construction (which does not include thin acrylic flood coat layers) shows that this construction exhibits extraordinary optical durability compared to 3M's commercial material (SS-95) of Roche U.S. Pat. No. 4,465,714.

EXPERIMENT

Figure 3:
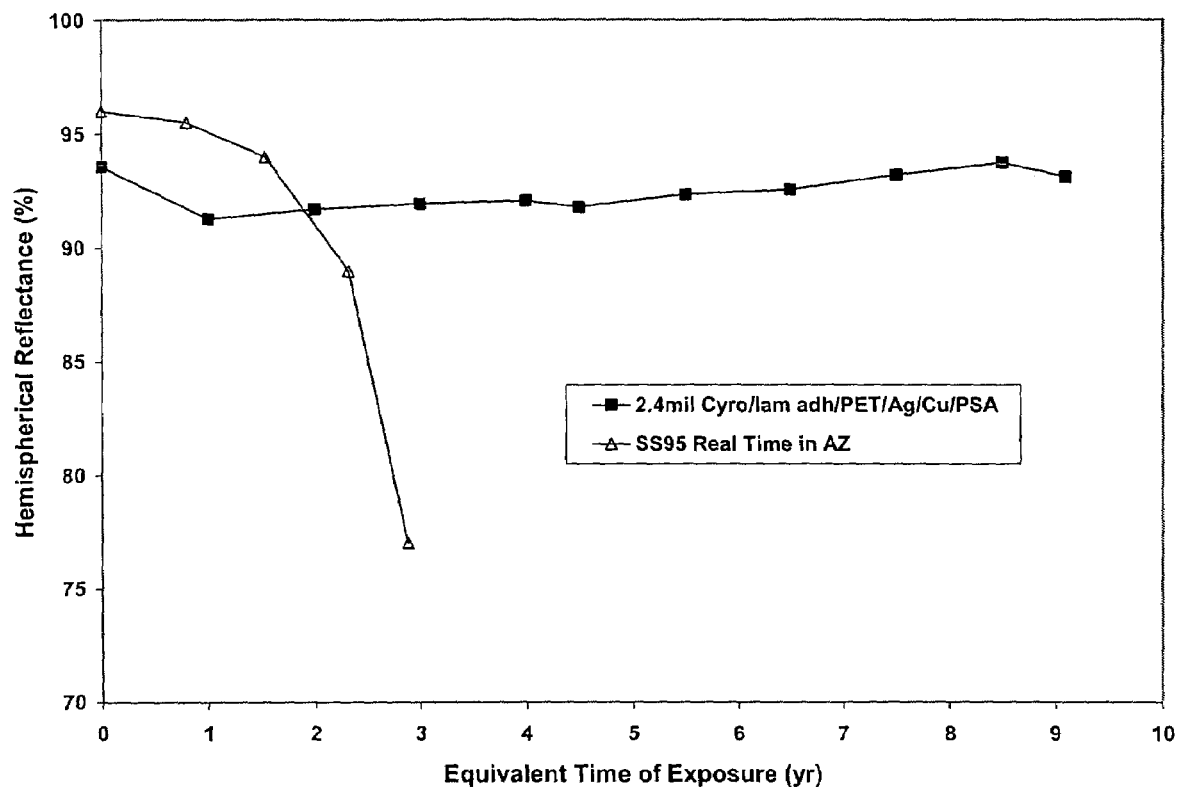
FIG. 3 is a graph showing Hemispherical Reflectance (%) versus Equivalent Time Exposure in years employing "Accelerated Outdoor Weathering of Nonmetallic Materials Using Concentrated Sunlight" on the advanced UV-resistant silver mirror construction of the invention and the SS-95 mirror construction of 3M as disclosed in U.S. Pat. No. 4,645,714.

FIG. 3 shows the dramatic improvement in optical durability of the new reflector construction of the invention (that does not include thin acrylic flood coat layers) compared with 3M's commercial material (SS-95) based on Roche's patent. The unfilled triangle symbols show the change in reflectance for the SS-95 reflector as a function of real-time exposure in Phoenix, Ariz. The filled symbols depict results for a preferred embodiment of improved laminate reflector construction. These materials were subjected to accelerated outdoor exposure at about ~5 times natural sunlight. These exposures were made using an ACUVEX® (Accurate Controlled Ultra Violet EXposure) weathering device, in accordance with the testing standard ASTM G 90, "Accelerated Outdoor Weathering of Nonmetallic Materials Using Concentrated Natural Sunlight." The filled square symbols are for our improved reflector having the construction 2.4 mil thick acrylic UV screen/PET/Ag/Cu/PSA, where PET is polyethylene terephthalate (a polyester) and PSA is a pressure sensitive adhesive. The equivalent time of exposure for the ACUVEX® exposed materials is based on cumulative dose of ultraviolet sunlight.

As can be seen, while the initial reflectance of the SS-95 material is slightly greater than the improved reflector, the reflectance of the SS-95 drops very rapidly after about-2 years of outdoor exposure. The improved invention mirror, however, retains high (in excess of 90%) hemispherical reflectance for over 9 years of equivalent outdoor exposure.

Figure 4:
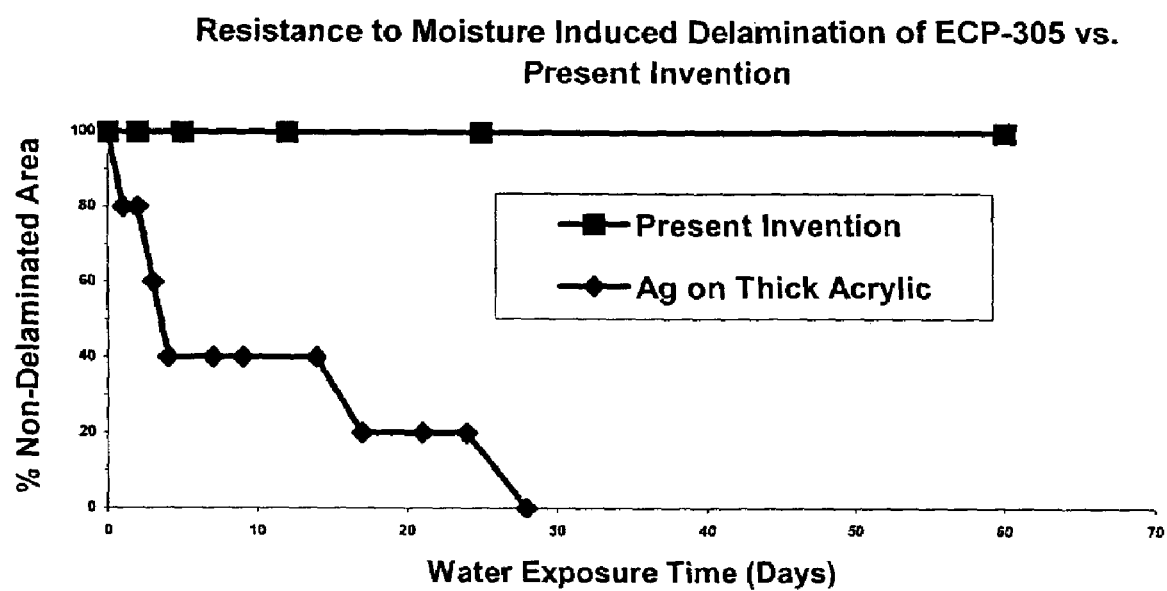
FIG. 4 is a graph showing the percent of area that has not undergone delamination failure as a function of time of immersion in water on the advanced UV-resistant silver mirror construction of the invention and samples of silvered thick acrylic mirrors.

Another deficiency of the prior art was related to constructions in which silvered thick acrylic films were specified. The inherent adhesion of vacuum-deposited silver with an acrylic film is poor. Upon exposure to moisture during outdoor service, solar mirrors that incorporate a silver/acrylic construction were found to be particularly susceptible to a failure mode known as tunneling wherein the silver layer catastrophically delaminates from the base acrylic film. The thick acrylic film absorbs moisture and swells, producing mechanical stresses that induce delamination with the silver layer. This effect is shown explicitly in FIG. 4. These results are for tests in which candidate silvered polymer solar mirror constructions are immersed in water and the % of delaminated area is measured as a function of length of immersion time. For samples of silvered thick acrylic films as specified in the cited prior art, 60% of the mirror surfaces had delaminated after only 4 days. This constitutes complete and unacceptable failure.

While the invention has been described with reference to specific embodiments, it is to be understood that various modifications and alterations of the invention will become apparent to those skilled in the art, and such modifications and alterations can be made without departing from the scope and spirit of the invention which is defined by the claims hereafter.

We claim:

1. A silver mirror construction that maintains a high percentage of hemispherical reflectance throughout the UV and visible spectrum when used in solar reflectors, comprising:
   a) a pressure sensitive adhesive layer positioned beneath a silver overlay;
   b) a polymer film disposed on said silver overlay;
   c) an adhesive layer positioned on said polymer film; and
   d) a UV-screening acrylic film disposed on said adhesive layer positioned on said polymer film, wherein said UV-screening acrylic film has a thickness 2 mil or greater.

2. The silver mirror construction of claim 1, wherein a copper layer is interposed below said silver overlay and above said pressure sensitive adhesive layer.

3. The silver mirror of claim 2, wherein said polymer film is polyethylene terephthalate.

4. The silver mirror construction of claim 3 wherein said UV screening acrylic film has a thickness of 2-8 mil.

5. The silver mirror construction of claim 4, wherein said high percentage of hemispherical reflectance is in excess of 90% for a period beyond about 2 years.

6. The silver mirror construction of claim 5, wherein said high percentage of hemispherical reflectance is in excess of 90% for a period in excess of about 9 years.

7. The silver mirror construction of claim 1, wherein said polymer film is polyethylene terephthalate.

8. The silver mirror construction of claim 7 wherein said UV screening acrylic film has a thickness of 2-8 mil.

9. The silver mirror construction of claim 8, wherein said high percentage of hemispherical reflectance is in excess of 90% for a period beyond 2 years.

10. The silver mirror construction of claim 9, wherein said high percentage of hemispherical reflectance is in excess of 90% for a period in excess of about 9 years.

11. The silver mirror construction of claim 1, wherein said polymer film is a polyester.

12. A silver mirror construction that maintains a high percentage of hemispherical reflectance throughout the UV and visible spectrum when used in solar reflectors, comprising:
   a) a pressure sensitive adhesive layer positioned beneath a silver overlay;
   b) a polymer film disposed on said silver overlay;
   c) an adhesive layer positioned on said polymer film; and
   d) a UV-screening acrylic film disposed on said adhesive layer positioned on said polymer film;

wherein said silver mirror construction does not include acrylic coating layers and the UV-screening film is thicker than 0.4 mil.

* * * * *